Sept. 8, 1970  K. H. RECKER  3,527,039
FRUIT HARVESTER INCLUDING RECIPROCABLE AND ROTATABLE
ROD-LIKE HELICAL MEMBER
Filed April 27, 1967

INVENTOR.
KENNETH H. RECKER
BY
ATTORNEYS

United States Patent Office 3,527,039
Patented Sept. 8, 1970

3,527,039
FRUIT HARVESTER INCLUDING RECIPROCABLE AND ROTATABLE ROD-LIKE HELICAL MEMBER
Kenneth H. Recker, Winter Haven, Fla., assignor to Heli Pic, Incorporated, Polk County, Fla., a corporation of Florida
Filed Apr. 27, 1967, Ser. No. 634,201
Int. Cl. A01g 19/08
U.S. Cl. 56—328                                      3 Claims

ABSTRACT OF THE DISCLOSURE

Harvesting apparatus comprises a mobile boom structure supporting a tree foliage engaging means having reciprocable axial movements whereby the foliage engaging means may be inserted into foliage of the tree and reciprocated to shake the tree branches near their extremities and cause fruit to be separated from the branches. The foliage engaging means includes a rod-like member in the form of a helix which is threaded into the foliage of the tree and reciprocated axially to shake the crop from the tree after which the member is unthreaded from the tree. The helix may be inserted or threaded into the foliage from various desirable angles relative to the tree.

---

The present invention relates to harvesting method and apparatus and more particularly relates to harvesting method and apparatus wherein a crop is harvested from trees or bushes.

Heretofore it has been a practice to harvest fruits, nuts, and the like by vibration or shaking of relatively rigid limbs of the trees upon which the fruit or nuts have grown, causing the fruit or nuts to be shaken from the branches and twigs on which they have grown. Mechanisms for shaking the tree limbs generally have a clamp or abutment which engages the more or less substantial portions of the limbs and imparts a relatively substantial oscillating force thereto. This force is frequently transmitted to the trunks of the trees and results in loosening of the tree roots as well as damage to the limbs.

A principal object of the present invention is the provision of a new and improved method and apparatus for harvesting fruits or nuts wherein tree or bush branches are shaken to dislodge fruit or nuts therefrom by application of a shaking motion to the branches of the tree adjacent the outer extremities thereof, whereby the forces of the oscillations imparted to the branches is not transmitted in any appreciable extent to the more rigid parts of the tree thereby obviating damage to the trees, the extent of excursions of the oscillating branches and the rate of oscillation so as to obviate damage to the tree and yet effectively to remove the fruit.

A further object of the present invention is the provision of a new and improved mechanism for shaking tree and bush branches comprising a helical member supported for rotation about its axis and for reciprocation along its axis, and which is adapted to be threaded into a cluster of branches and twigs so as to engage branches and foliage throughout a relatively wide area, and which member is reciprocated axially in strokes of suitable length and frequency to cause fruit or nuts on the branches of the foliage engaged by the helical member to be shaken and separated therefrom without damaging movements to the limbs, branches or foliage of the tree or bush.

Another object of the present invention is the provision of a new and improved method and apparatus of harvesting a crop from a crop bearing tree or bush wherein a member including spaced rod-like sections is positioned in an outer extremity of a tree with crop bearing branches and twigs extending between the rod-like sections for engagement with extended surface portions of the sections, and wherein the member is cyclically agitated to impart a shaking force to the branches and twigs to dislodge the crop therefrom.

A still further object of the invention is a provision of a new and improved mechanism of the type referred to in which the helical branch engaging member is attached to the end of a boom structure which is supported on a suitable vehicle, and which boom may be swung in horizontal and vertical planes, and wherein the branch engaging member is adapted to be positioned with its axis angled from a horizontal direction to a vertical direction.

Other objects and advantages of the present invention will become apparent from the consideration of the following detailed description thereof made with reference to the accompanying drawings which form a part of the specification, and in which.

Figure 1:
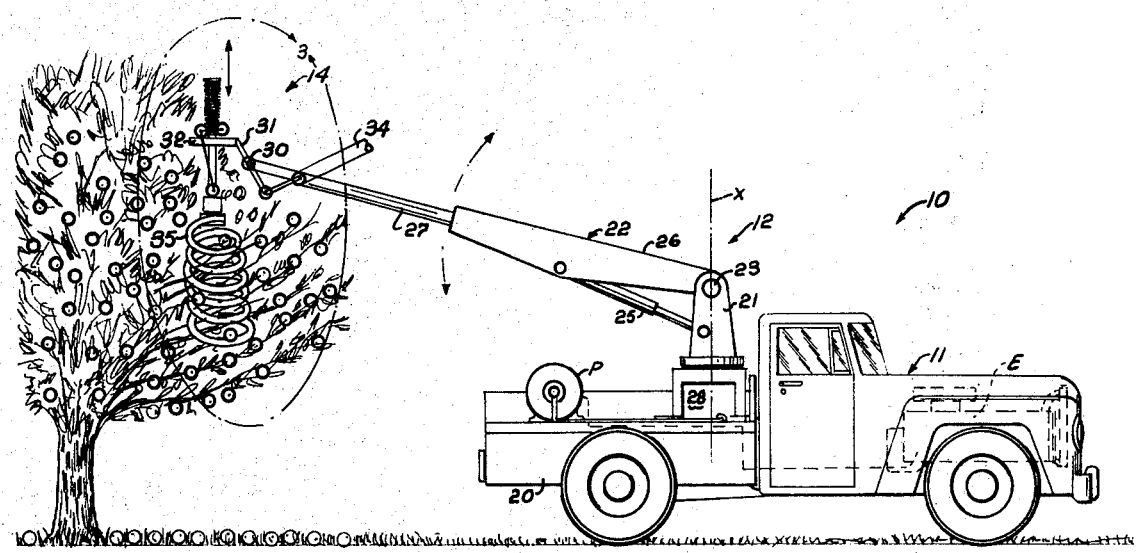
FIG. 1 is a schematic view of harvesting apparatus embodying the invention.

FIG. 1 illustrates a harvesting conventional apparatus 10 embodying the invention and which includes a vehicle 11 such as a truck, having a boom structure 12 supported thereon, and which boom structure supports harvesting means 14 at its end. The truck 11 is adapted to be maneuvered in conventional fashion into positions adjacent trees by the boom structure, bearing the crop to be harvested and the harvesting means 14 is engaged with the tree branches. The truck 11 is equipped with a conventional hydraulic system, including a pump P driven by the truck engine E for supplying hydraulic fluid to hydraulically actuated elements of the boom structure 12 and harvesting means 14.

The boom structure 12 is supported on the bed 20 of the truck 11 and includes a support member 21 fixed to the bed 20 and an extensible boom assembly 22 pivoted to the support member at 23 for swinging the harvesting means 14 in a vertical plane. The boom assembly 22 is moved in the aforementioned vertical plane by a hydraulic actuator 25 connected between the support member 21 and boom assembly 22 by suitable pivots so that the elevation of the harvesting means 14 may be controlled.

The extensible boom assembly 22 includes a tubular boom member 26 connected to the support at the pivot 23, and a second boom member 27 is telescopingly supported in the member 26 and is extended from and retracted into the member 26 to change the length of the boom assembly 22 by a suitable hydraulic actuator, not shown.

In the preferred embodiment of the invention, the support member 21 is adapted to be rotated about a vertical axis X by a hydraulic actuator for swinging the boom assembly 22 in a horizontal arc. The hydraulic actuators referred to are all associated with suitable valving for controlling their operation and the valving is located at a suitable control station 28, shown schematically, as is the usual practice, so that the boom structure is controlled by an operator of the apparatus at the control station.

The boom member 27 includes a suitable pivot structure 30 at its end to which the harvesting means 14 is attached so that the means 14 may be swung about the pivot 30 in a vertical plane independently of the boom assembly 22 and between the positions shown in FIGS.

1 and 2. The harvesting means 14 includes an arm 31 pivoted to the boom structure 22 and 30 and a frame 32, rigidly attached at the outer end thereof. A hydraulic actuator 34 is connected between the boom member 27 and the arm 31 by suitable pivot connections so that the arm may be controllably swung about the pivot 30 to thereby change the angularity of the arm and frame with respect to the boom member 27. The actuator 34 is connected in the hydraulic system through suitable control valves located at the control station 28.

In accordance with the present invention, the harvesting means 14 comprises a helix 35 which is formed by a rod and is supported on the frame 31 so as to rotate about its axis and to be reciprocated axially. The rod in the form of a helix can be readily threaded into the tree foliage by rotating the helix about its axis while advancing it axially into the foliage. The helix 35 provides a plurality of elongated branch and twig engaging surfaces formed on spaced sections of the rod which can be inserted between the branches, twigs, etc., and in loose engagement therewith and impart a reciprocating movement thereto without damage to the foliage in branches when the helix is reciprocated axially. When the branches and twigs of the tree extend between the surface portions, the member 35 is agitated or reciprocated relative to the supporting frame 31 through a suitable stroke length and frequency so that the aforementioned surface portions engage the branches and twigs and cause a relatively violent, but controlled shaking of the branches and twigs through a limited excursion so that the crop is separated therefrom without damaging agitation of the more rigid parts of the tree, such as the heavy limbs and trunk thereof.

In the preferred embodiment of the invention, the helix member 35 is composed of metallic material in the form of a helix having a diameter of approximately 12 inches and a coil pitch of approximately 7 inches. The helix 35 is connected at one end to a shaft 36 which is supported by the frame 32 for axial rotation and for longitudinal reciprocating movement along its axis. The frame member 32 is an open rectangular structure comprised of four members, 33a, 33b, 33c, 33d, mitered and welded together at their ends to provide a substantially square opening through which the shaft 36 extends.

Figure 4:
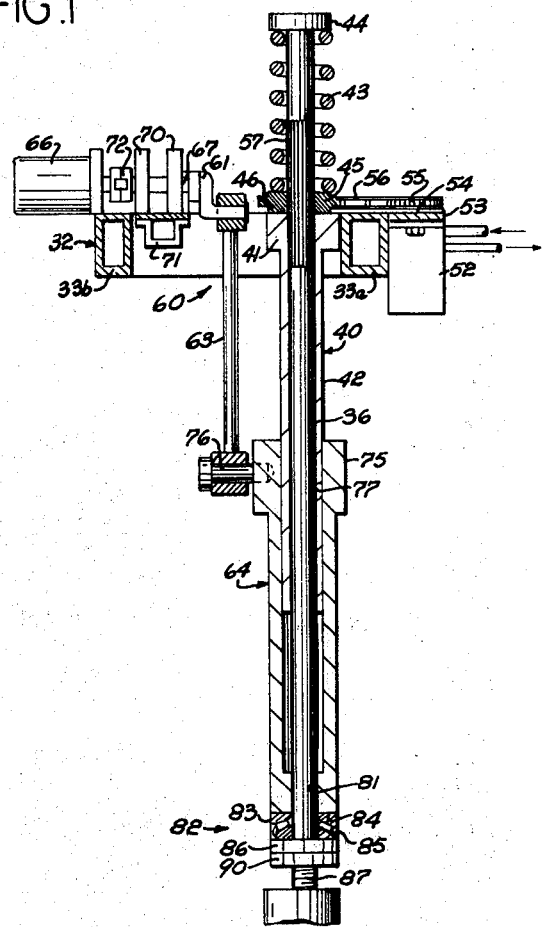
FIG. 4 is a sectional view taken approximately at line 4—4 of FIG. 3 and on a different scale from that of FIG. 3.

A guide tube 40 is rigidly fixed to an inner wall of the frame member 33a and guides the shaft 36 for rotational and reciprocating movement with respect to the frame 33. As best seen in FIG. 4, the guide tube 40 includes a collar portion 41 fixed to the frame member 33a and a tubular portion 42 having an internal bore closely surrounding the shaft 36 and extending downwardly from the frame member 33 as viewed in the drawings. The diameter of the bore of the guide tube 40 is of such size that the shaft 36 is freely movable therein.

The shaft 36 is supported relative to the frame 32 by a compression spring 43 which is contained between the enlarged end portion 44 of the shaft 36, at its upper end, and a sprocket member 45 surrounding the shaft 36 and seated against an upper surface 46 of the collar 41. The sprocket member 45 is described in more detail presently, suffice it to say that the sprocket member 45 provides a seat for the helical compression spring 43 so that the spring force urges the shaft 36 in an upward direction, as viewed in the drawings.

The shaft 36 and helical member 35 are rotated by means including a fluid operated rotary motor 52 attached to the frame member 33a at the side thereof adjacent the point of connection between the frame member 33a and the collar 41 of the guide tube 40. The motor 52 is, in the preferred embodiment, suitably fastened to a flange member 53 which extends outwardly of a side frame member 33a of the frame 33 and includes a driving shaft 54 which extends through an opening in the flange member 53. The driving shaft 54 mounts a sprocket 55 which is drivingly connected to the sprocket 45 by a chain 56 which is trained around the sprocket members.

The motor 52 is connected in fluid circuit to the pump P through suitable control valving at the control station so that when a fluid pressure is applied thereto through the valving, the sprocket 54 drives the sprocket 45 and the shaft 36. A spline connection between the sprocket 45 and the shaft 36 permits rotation of the shaft 36 when the motor 52 is operated. The external spline teeth 57 on the shaft 36 are of substantially greater length than the internal spline teeth on the sprocket 45 so that the shaft 36 is freely movable axially relative to the guide tube 40. When the member 35 has been advanced into a cluster of branches and twigs, the control valve for the motor 52 is actuated by the operator of the apparatus to stop further rotation of the shaft 36. The shaft 36 is reciprocated along its axis so that the branches and twigs engaged by the helical member 35 are agitated at a rate depending upon the frequency of reciprocation of the shaft 36 and through a distance depending upon the stroke length of the shaft, and which rate and length are controlled.

The reciprocating movement of the shaft 36 is effected by a slider-crank mechanism 60 including a crank arm 61 rotatably supported on the frame 32, a connecting rod 63, and a slider member 64 which cooperates with the shaft 36 to effect the aforementioned reciprocating motion thereof. As illustrated in FIG. 4, the crank member 61 is driven by a rotary fluid motor 66 which is fixedly supported on the frame member 33b of the frame 32, and includes a crank shaft 67 suitably attached to the crank arm 61. The shaft 67 extends from the side frame member 33b toward the shaft 36 and is supported between the motor 66 and crank arm 61 by suitable bearings, generally designated at 70, which are supported on a member 71 extending across the opening in the frame member 33. In the preferred embodiment, the driving shaft 67 is connected to the rotor of the motor 66 through a suitable universal coupling 72.

The connecting rod 63 is connected between the crank arm 61 and the slider 64 by the usual rod end bearing constructions so that when the crank arm 61 is rotated, the slider member 64 is reciprocated upwardly and downwardly by the connecting rod 63, as viewed in FIG. 4. The slider 64 is a generally tubular member having a collar 75 at its upper end to which a trunion 76 is attached and which is connected with the bearing structure at the lower end of the connecting rod 63. The slider 64 includes a first internal bore 77, extending through the collar 75, which is of slightly greater diameter than the outer diameter of the tube portion of the guide tube 40 so as to telescopingly receive the latter. The lower end 80 of the slider 64 includes a second internal bore 81 which is of slightly greater diameter than the diameter of the shaft 36 so that the shaft 36 is freely rotatable with respect to the slider 64.

Bearing means 82 is provided between the shaft 36 and the outer end of the slider 64, which permits relatively free rotation of the shaft 36 relative to the slider 64 while permitting axial movement of the shaft in response to axial movement of the slider 64. As illustrated in FIG. 4, the bearing means 82 includes a thrust bearing assembly 83 held between abutting surfaces 84, 85 formed on the slider 64 and shaft 36 respectively. In the illustrated embodiment, the abutment surface 85 on the shaft 36 is formed by an internally threaded member 86 which is advanced axially of the shaft 36 along suitable screw threads 87 to preload the bearing assembly 83 between the abutment surfaces. If desired, a locking nut member 90 may also be threaded on the shaft 36 to maintain the abutment member 86 in its desired position.

When the motor 66 is operated to rotate the crank 61, and the slider 64 is moved in a downward direction, the downward motion of the slider 64 is transmitted to the shaft 36 through the bearing means 82 so that the shaft 36 is moved downwardly against the bias of the spring 43. As the crank arm 61 rotates to move the slider 64 upwardly, the spring 43 moves the shaft 36 upwardly and maintains the shaft 36 in engagement with the slider 64 through the bearing means 82, as described.

Figure 2:
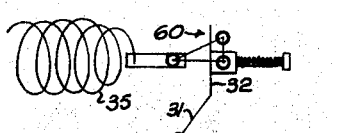
FIG. 2 is a fragmentary view of a portion of the apparatus in FIG. 1 in a different operative position from that shown in FIG. 1 and on an enlarged scale.
Figure 3:
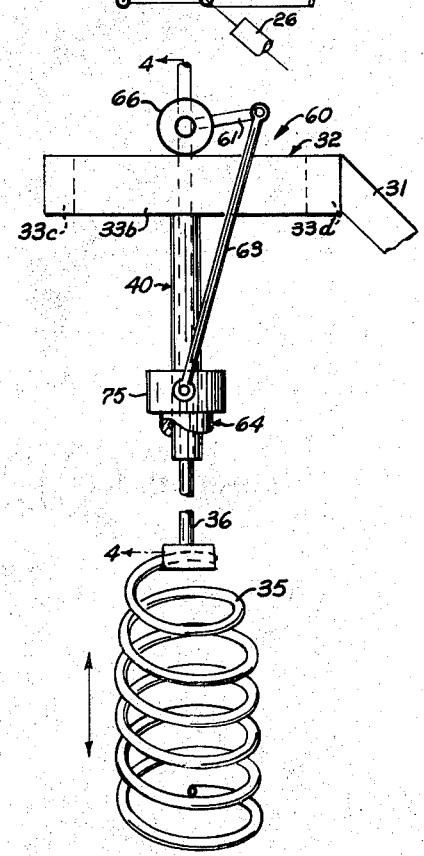
FIG. 3 is a fragmentary sectional view of a portion of the apparatus of FIG. 1 within the line 3 of FIG. 1 and shown on a larger scale.

In operation, the trunk 11 is maneuvered to a suitable position adjacent a tree bearing the crop to be harvested, and the boom assembly 22 is actuated by manipulation of the proper valving to move the harvesting means 14 to a position for insertion into the foliage of the tree and in which position the open end of the helix 35 is adjacent a cluster of twigs and branches bearing fruit. The helix 35 may be positioned to be inserted from any convenient angle. It may be preferably in some instances to insert the helix into the tree from an overhead vertical direction, while in other cases it may be desirable to move the helix into the tree along a more or less horizontal line (see FIG. 2). The motor 52 is actuated to drive the shaft 36 and rotate the helical member 35 about its axis. With the member 35 rotating, the boom assembly 22 is manipulated so as to advance the open end of the helix 35 into the selected cluster of branches and twigs along the helix axis and at a rate corresponding to the pitch rate of the helix. The member 35 is, in effect, screwed or threaded into the cluster of twigs and branches so that a substantially large number of the twigs and branches extend between adjacent convolutions or sections of the helix.

The motor 52 is stopped and the motor 66 is then activated so as to reciprocate the shaft 36 and the helix 35. The mass of branches, twigs, etc. engaged by the convolutions of the helix are reciprocated as a mass, and the stroke length or excursions of the branches due to the axial reciprocation of the helix, is limited to prevent damage to the branches or tree limbs and trunks. On the other hand, the strokes, are of such length and frequency that the fruit or nuts are snapped from their branches. The frequency of the strokes is determined by the rotational speed of the motor 66 which is regulated by the operator through the valving at the control station.

Although the helix 35 is reciprocated axially through a given length of stroke, the helix could be reciprocated by a piston type motor controlled to selectively vary the length and frequency of the strokes to provide the most effective and safest action for any given fruit tree or the like. The fruit or nuts thus shaken from the tree may be collected in nets or other convenient collecting means, not shown.

The motor 52 is then reversed and the boom structure 22 controlled in a manner to axially withdraw the helix from the foliage cluster as the helix is "unthreaded" therefrom. It is apparent that threading and unthreading of the member 35 into and out of the trees leaves the branches and twigs of the tree undamaged and that the relatively rigid parts of the tree are not affected as a result of operation of the harvesting means 14.

In certain instances it may be desirable to provide hydraulically operated jacks on the vehicle 11 to support the vehicle as the member 35 is being maneuvered and reciprocated in the tree, so as to prevent tipping and undue vibration of the vehicle. Such hydraulic jacks are of conventional construction, and for the purposes of simplicity, have not been illustrated in the drawings.

It can now be seen that a new and improved harvesting method and apparatus has been provided wherein twigs and branches of a crop bearing tree are loosely engaged by a branch engaging member, and wherein the crop is removed from the tree by reciprocating the branch engaging member to shake the crop from the branches without substantial shaking of the more rigid parts of the tree, such as the large limbs and trunk thereof which might otherwise damage the tree. While a single embodiment of the present invention has been illustrated and described herein in considerable detail, the present invention is not to be considered to be limited to the precise construction shown.

Having described my invention, I claim:

1. Apparatus for harvesting a crop from a crop bearing tree or the like comprising a helical member having one end portion adapted to be threaded into foliage of a tree to thereby receive tree foliage including branches between adjacent convolutions of said member, support means at the opposite end of said member supporting said member for rotation about its axis, transporting means for said member including a boom carrying said support means and operative to position said helical member for threading thereof into tree foliage, power means for rotating said helical member in opposite directions about its axis, control means for said transporting means and said power means to move said boom to advance and withdraw said helical member from the tree foliage and to rotate said helical member in opposite directions about its axis during said advance and withdraw movements of said boom respectively, and means supported on said support means operative to reciprocate said member along its axis within a limited range of movement and at a frequency to cause the foliage between said adjacent convolutions to be vibrated so as to cause crop on said foliage to separate therefrom.

2. Apparatus as defined in claim 1 further characterized by said support means including a frame carried by said boom, an elongated guide projecting from said frame, a slide attached to said member and slidable along said guide, and said last mentioned means comprising a crank rotatably supported on said frame, a connecting shaft interconnecting said crank and said slide, and a motor for driving said crank.

3. Apparatus as defined in claim 1 further characterized by said member being formed of a rod shaped in the form of a helix.

References Cited

UNITED STATES PATENTS

| | | | |
|---|---|---|---|
| 3,175,329 | 3/1965 | Beckman | 56—332 X |
| 3,184,908 | 5/1965 | Rust | 56—330 |
| 3,410,068 | 11/1968 | Recker | 56—332 |
| 3,439,481 | 4/1969 | Hall | 56—328 |
| 3,040,507 | 6/1962 | Lasswell | 56—328 |
| 3,143,844 | 8/1964 | Polk | 56—328 |
| 3,210,921 | 10/1965 | Middlesworth et al. | 56—328 |
| 3,413,786 | 12/1968 | Wehr | 56—328 |
| 3,417,558 | 12/1968 | Granger | 56—328 |

ROBERT PESHOCK, Primary Examiner

J. N. ESKOVITZ, Assistant Examiner